No. 629,765. Patented Aug. 1, 1899.
H. BUCHNER.
CYCLE DRIVING MECHANISM.
(Application filed Jan. 17, 1899.)
(No Model.)
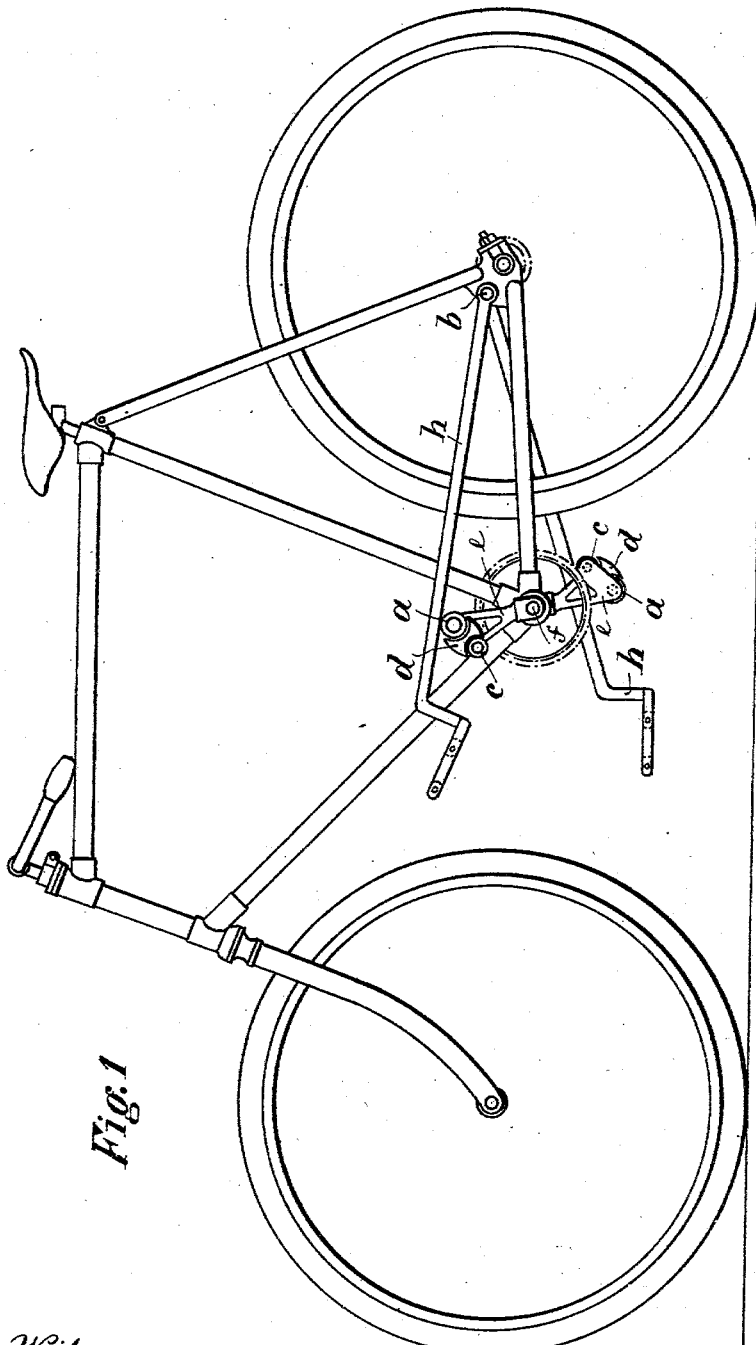
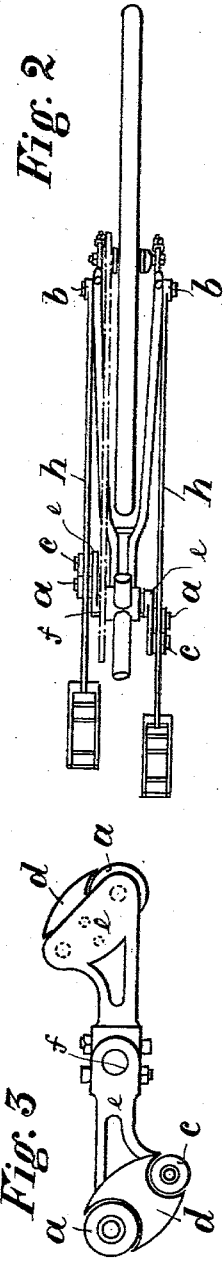
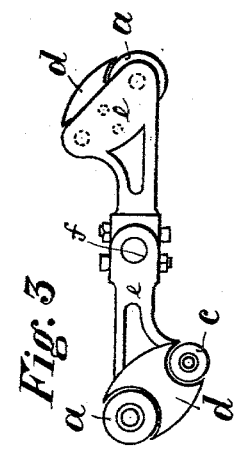

UNITED STATES PATENT OFFICE.

HANS BUCHNER, OF MUNICH, GERMANY.

CYCLE DRIVING MECHANISM.

SPECIFICATION forming part of Letters Patent No. 629,765, dated August 1, 1899.

Application filed January 17, 1899. Serial No. 702,386. (No model.)

*To all whom it may concern:*

Be it known that I, HANS BUCHNER, a citizen of Germany, and a resident of Munich, Germany, have invented certain new and useful Improvements in Cycle Driving Mechanism, of which the following is a specification.

This invention relates to a driving mechanism for cycles in which each crank is provided with at least two rollers, placed at different radial distances from the axle and successively engaged by the treadles, so as to limit the play of the latter while providing a large length of crank-arm for the downstroke.

In the accompanying drawings, Figure 1 is a side elevation of a bicycle provided with my improved driving mechanism. Fig. 2 is a plan thereof, and Fig. 3 a detail of the cranks.

To the outer end of each of the cranks $e$ is secured an antifriction-roller $a$, upon which the treadle $h$, pivoted to the frame at $b$, is adapted to bear. During the downstroke the treadle will press upon the roller to turn the crank and thus rotate the axle $f$; but to thus turn a crank of the necessary length the stroke of the treadle would have to be of a length which is not in proportion to the length of the human leg. In order, therefore, to limit the stroke of the treadle, I secure to the outer end of each crank a second antifriction-roller $c$, which is placed radially nearer to the axle $f$ than the roller $a$. This second roller $c$ will engage the treadle $h$ during the lower portions of the stroke and will raise it to be again received upon the roller $a$.

To avoid any jolting while the treadle passes from one roller upon the other, each crank is provided between the rollers with a fixed oval guide $d$. These guides are notched for the reception of the rollers, and will thus cause a smooth gliding of the treadle from one roller upon the other.

What I claim is—

1. A cycle driving mechanism composed of a crank provided with a pair of rollers placed at different radial distances from the axle, and of a treadle adapted to successively engage said rollers, substantially as specified.

2. A cycle driving mechanism composed of a crank provided with a pair of rollers placed at different radial distances from the axle, and a curved guide between the rollers, combined with a treadle adapted to successively engage the rollers, substantially as specified.

Signed by me, at Munich, Germany, this 29th day of December, 1898.

HANS BUCHNER.

Witnesses:
G. MONROE ROYCE,
EMIL HENZEL.